Figure 1:
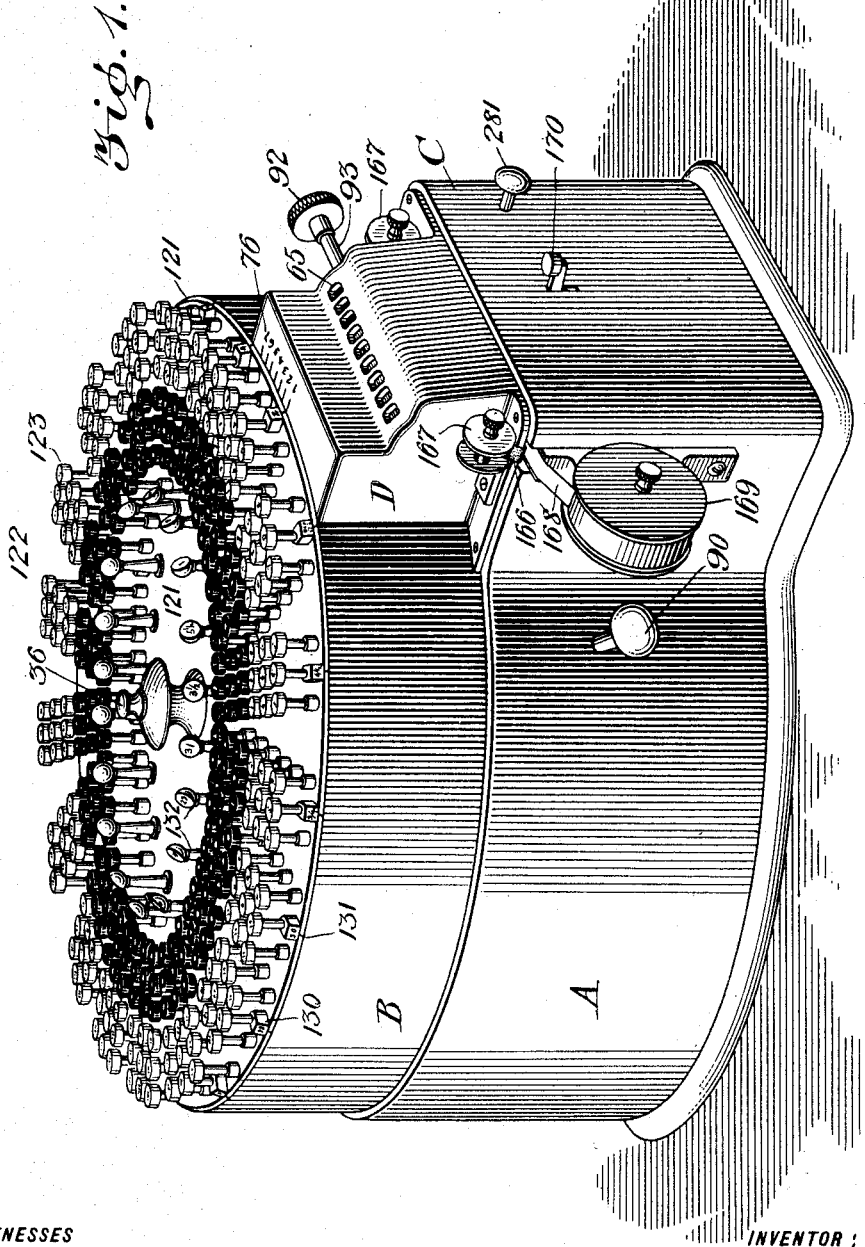

H. A. HENSLEY.
CALCULATING MACHINE.
APPLICATION FILED FEB. 20, 1909.

1,204,439.

Patented Nov. 14, 1916.
10 SHEETS—SHEET 1.

WITNESSES

INVENTOR;
Hubert A. Hensley,
BY
ATTORNEYS

H. A. HENSLEY.
CALCULATING MACHINE.
APPLICATION FILED FEB. 20, 1909.

1,204,439.

Patented Nov. 14, 1916.
10 SHEETS—SHEET 2.

WITNESSES

INVENTOR
Hubert A. Hensley,
BY
ATTORNEYS

H. A. HENSLEY.
CALCULATING MACHINE.
APPLICATION FILED FEB. 20, 1909.

1,204,439.

Patented Nov. 14, 1916.
10 SHEETS—SHEET 3.

WITNESSES

INVENTOR:
Hubert A. Hensley,
BY
ATTORNEYS

H. A. HENSLEY.
CALCULATING MACHINE.
APPLICATION FILED FEB. 20, 1909.

1,204,439.

Patented Nov. 14, 1916.
10 SHEETS—SHEET 4.

WITNESSES

INVENTOR:
Hubert A. Hensley,
BY
ATTORNEYS

H. A. HENSLEY.
CALCULATING MACHINE.
APPLICATION FILED FEB. 20, 1909.

1,204,439.

Patented Nov. 14, 1916.
10 SHEETS—SHEET 5.

WITNESSES

INVENTOR;
Hubert A. Hensley,
BY
ATTORNEYS

H. A. HENSLEY.
CALCULATING MACHINE.
APPLICATION FILED FEB. 20, 1909.

1,204,439.

Patented Nov. 14, 1916.
10 SHEETS—SHEET 7.

WITNESSES

INVENTOR:
Hubert A. Hensley,
BY
ATTORNEYS

H. A. HENSLEY.
CALCULATING MACHINE.
APPLICATION FILED FEB. 20, 1909.
1,204,439.
Patented Nov. 14, 1916.
10 SHEETS—SHEET 8.
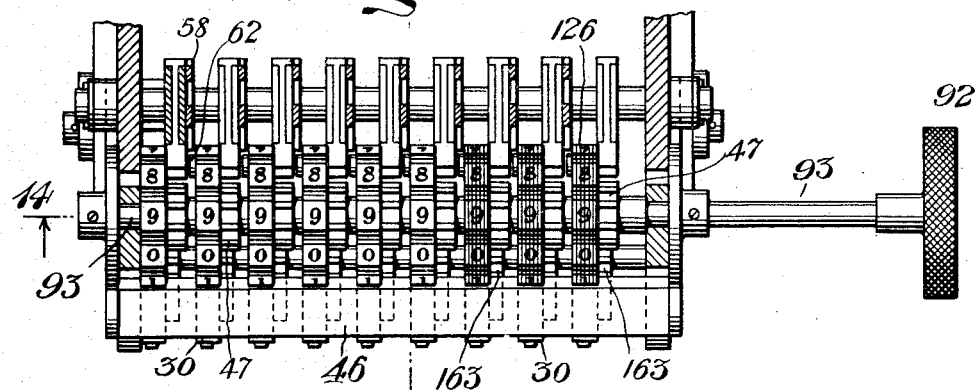
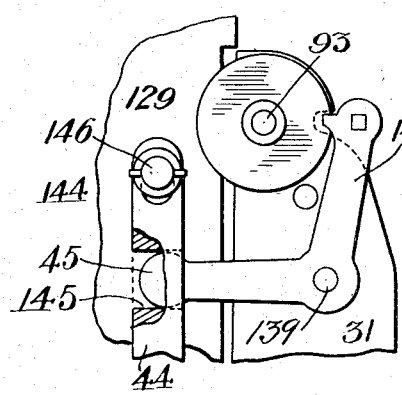
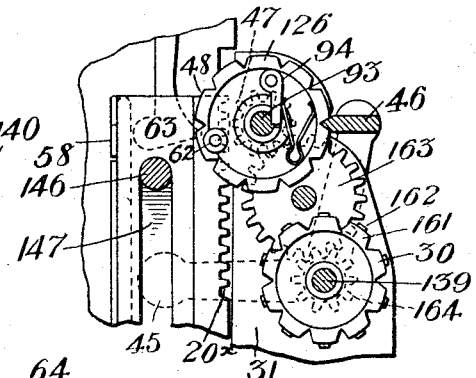
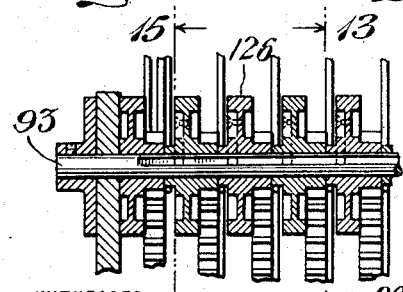
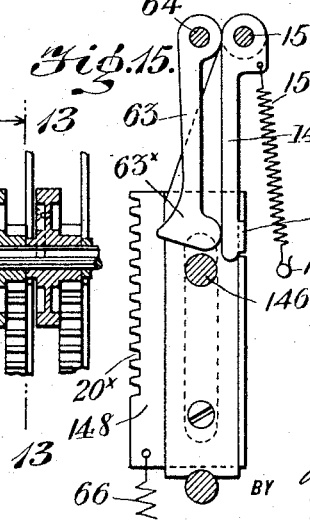
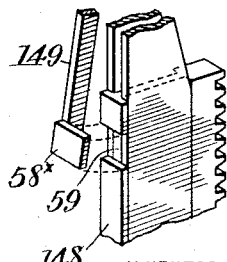
WITNESSES
INVENTOR:
Hubert A. Hensley,
BY
ATTORNEYS H. A. HENSLEY.
CALCULATING MACHINE.
APPLICATION FILED FEB. 20, 1909.
1,204,439.
Patented Nov. 14, 1916.
10 SHEETS—SHEET 9.
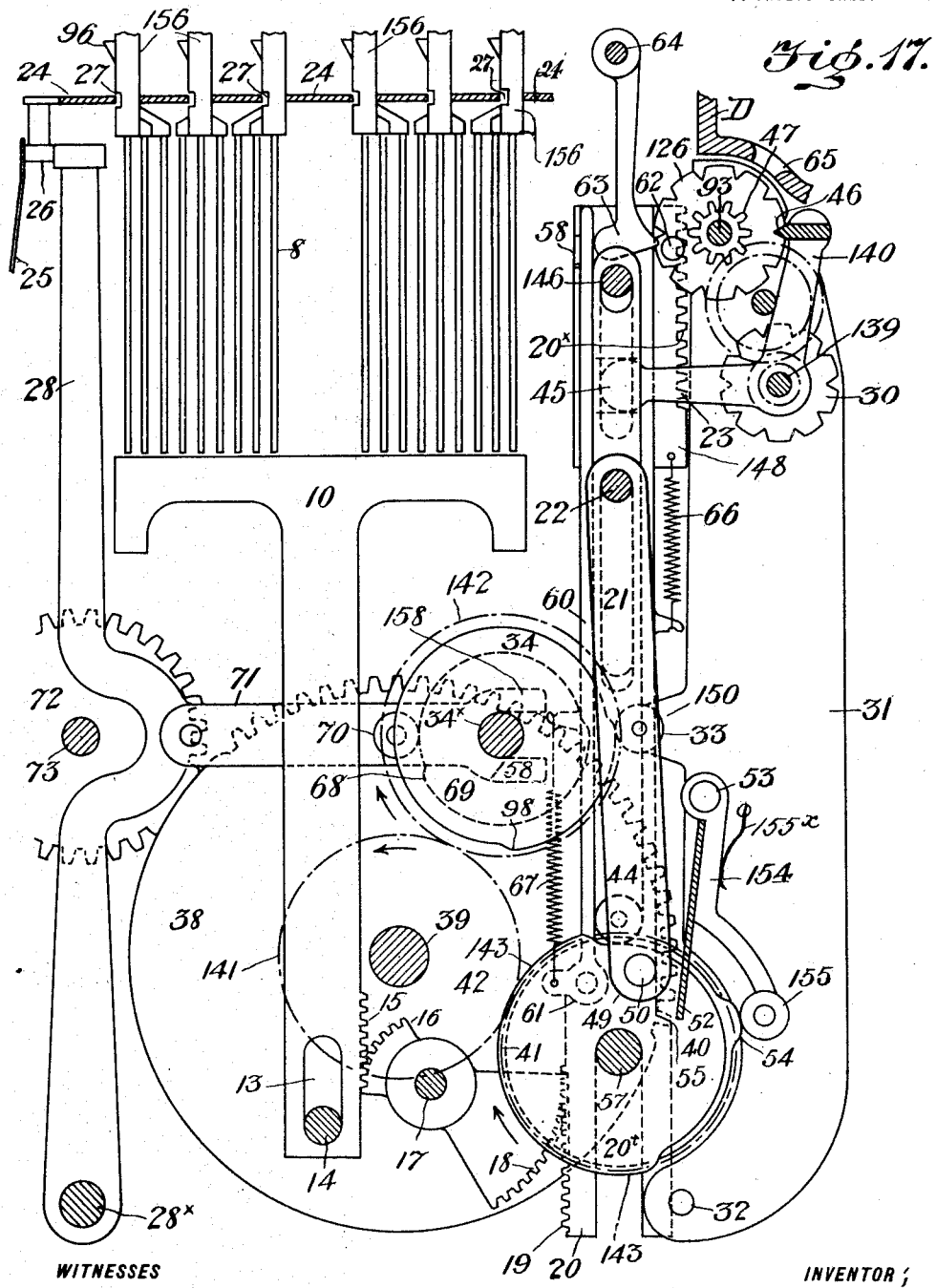

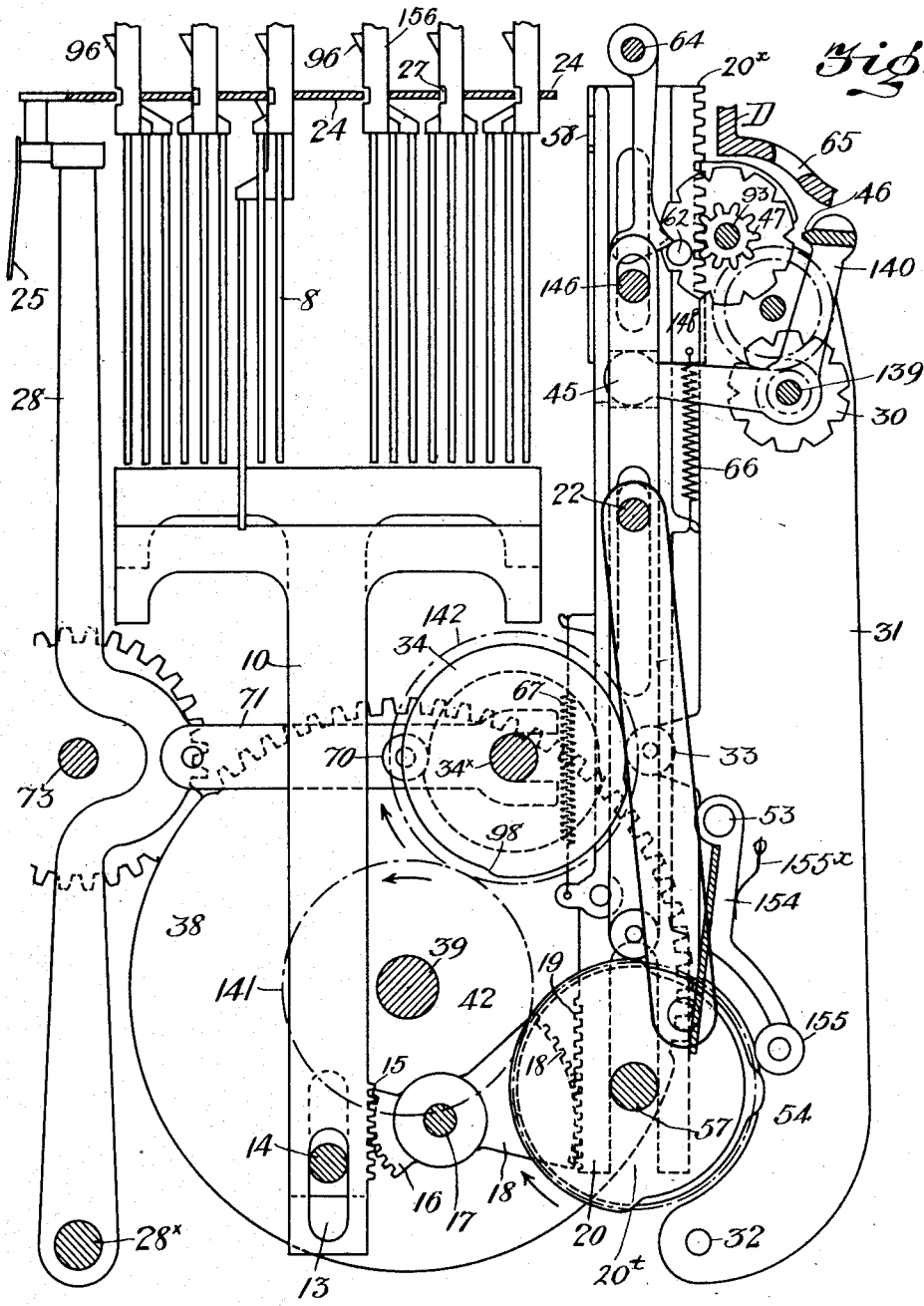

UNITED STATES PATENT OFFICE.

HUBERT A. HENSLEY, OF NEW ROCHELLE, NEW YORK.

CALCULATING-MACHINE.

1,204,439.  Specification of Letters Patent.  Patented Nov. 14, 1916.

Application filed February 20, 1909.  Serial No. 479,157.

*To all whom it may concern:*

Be it known that I, HUBERT A. HENSLEY, a subject of the King of Great Britain, residing at New Rochelle, in the county of Westchester and State of New York, have invented certain new and useful Improvements in Calculating-Machines; and I do hereby declare the following to be a full, clear, and exact description of the invention, such as will enable others skilled in the art to which it appertains to make and use the same.

This invention relates to calculating machines, and more particularly to calculating machines of the general type described in Letters Patent No. 823,219 issued to me on June 12, 1906, the machine described in said patent being particularly adapted for the calculation of interest upon any desired sum or sums for a given period of time; although adapted for effecting other calculations, as, for instance, the computation of exchange, and the like.

The object of the present invention is to improve my prior construction and provide a machine in which the various operative parts are more compactly arranged, these parts being inclosed in a casing of convenient size and shape and being actuated and controlled as far as possible by positive means as distinguished from springs and similar devices.

The invention aims further to provide a machine which is superior to my prior machine as regards the relation between the different groups of digit keys and the counting disks, and with this end in view the counting disks, instead of being mounted on a traveling carriage, are located in a fixed casing into register with which the various groups of digit keys are adapted to be moved. In order to obtain this result the digit keys are mounted in a casing rotatable about a vertical axis and the groups of keys are arranged radially with respect to this casing, so that when the casing is revolved the desired group of digit keys may be brought into coöperative relation with the counting disks into close proximity to which such group of keys is moved.

The invention also contemplates the use of a motor as an actuating device for the machine, the motor being housed within the casing and so connected with the operating mechanism as to produce the rotation of the casing section by which the digit keys and their adjunctive parts are carried. The connection of the motor with the different operative parts is a novel one by which numerous advantages are obtained, as will be hereinafter pointed out. The motor rotates continuously, but is only coupled with the operating mechanism at the moment desired, this coupling being effected by simple means operated through a depressible button arranged centrally of the top of the casing.

I have also in view the provision of recording mechanism in connection with the counting disks, so that the result of a calculation can be printed by suitable mechanism upon a paper strip, whereby a record of the calculation is obtained which can be kept as long as necessary. The counting disks are suitably geared with printing wheels, against which the paper strip can be moved at any time by means of a key projecting from the casing at its front part, a suitable inking ribbon, of course, being interposed between the strip and the various printing wheels.

The invention also provides means by which the key-carrying casing section may be disengaged from its geared driving connection in order to be freely movable on its axis in either direction; and novelty also resides in certain details of the construction, such as the means connecting the digit keys with the counting disks, and the means which are provided for locking the keys against movement except when the group in which the keys are located is in coöperative relation with the counting mechanism.

Other novel details of the construction will appear hereinafter and be pointed out in the claims.

Figure 2:
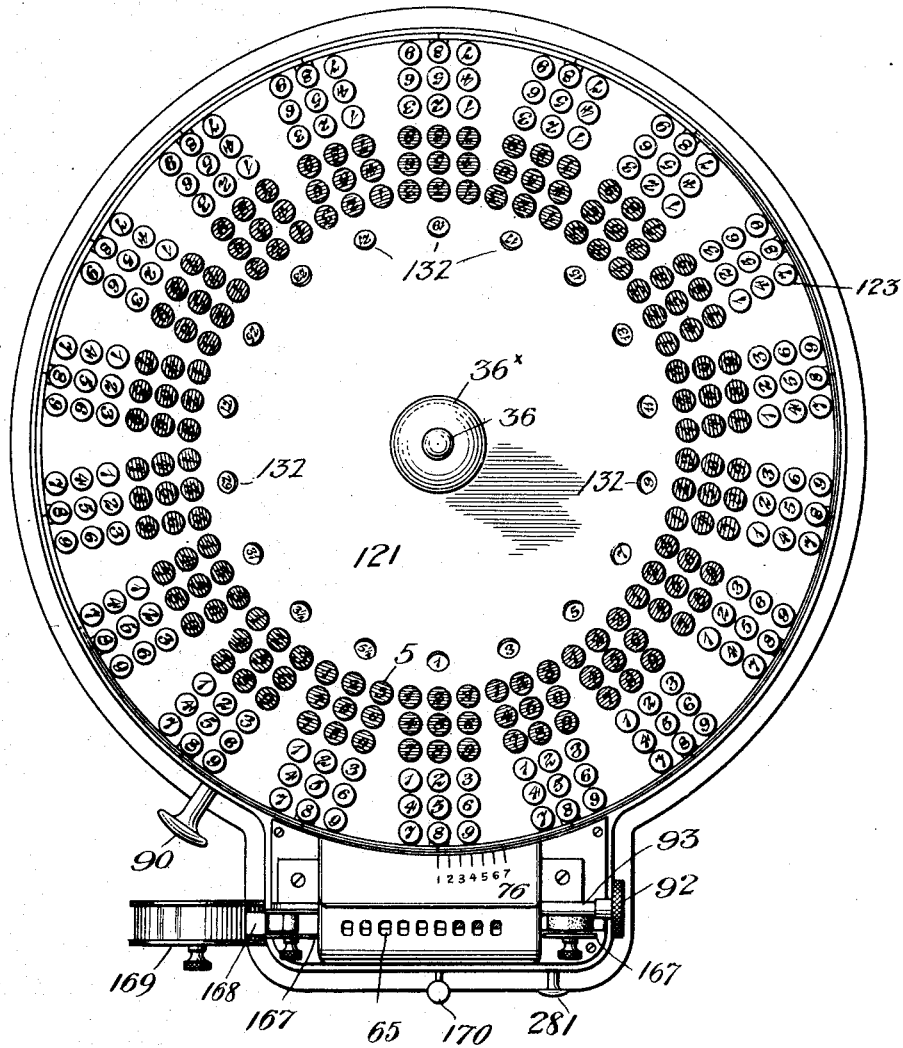
Figure 3:
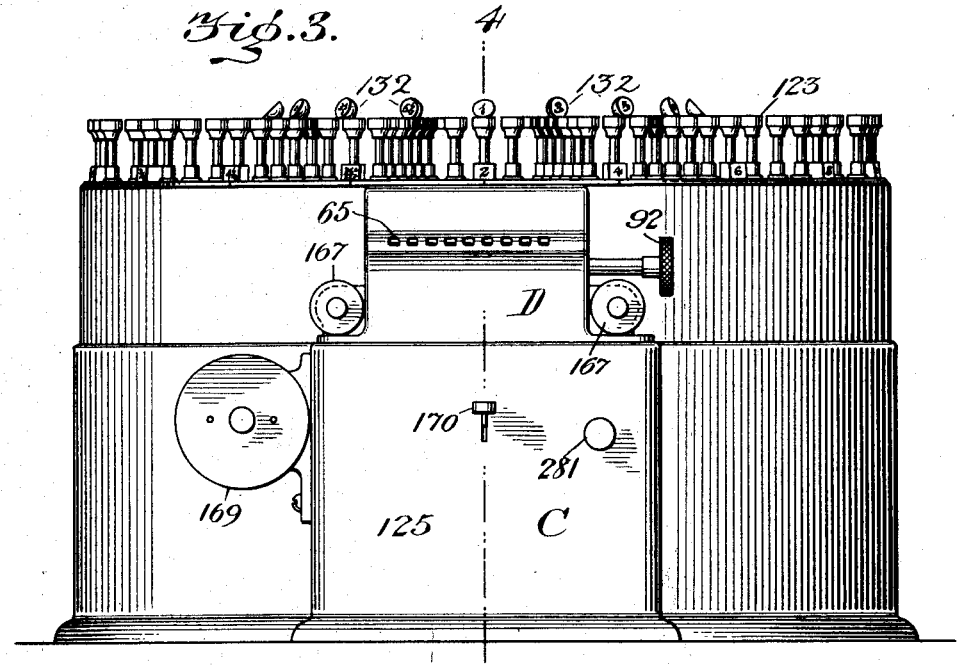
Figure 4:
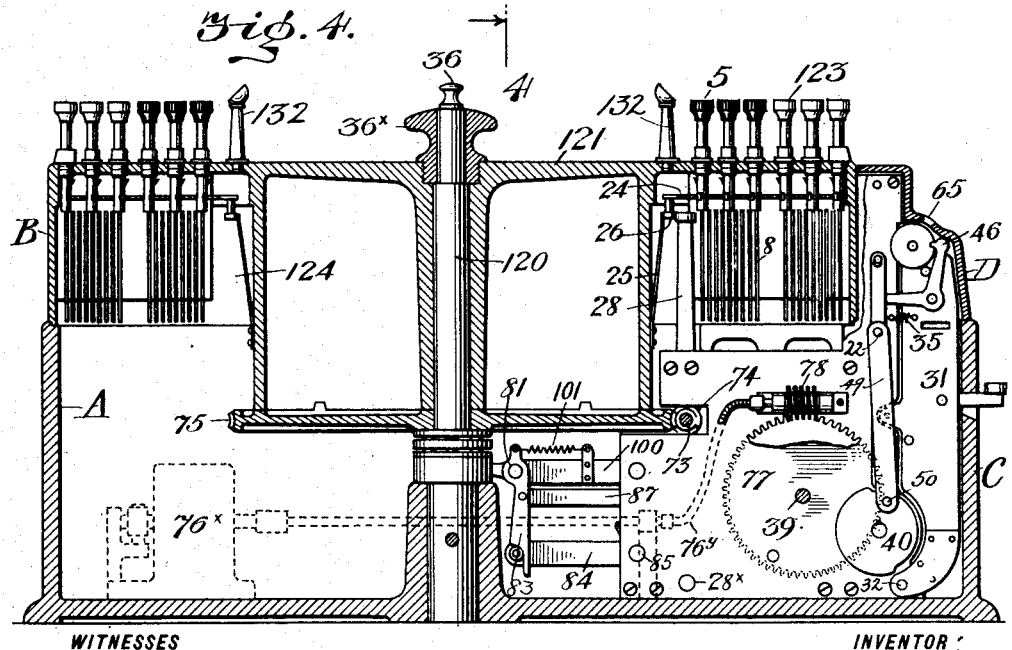
Figure 5:
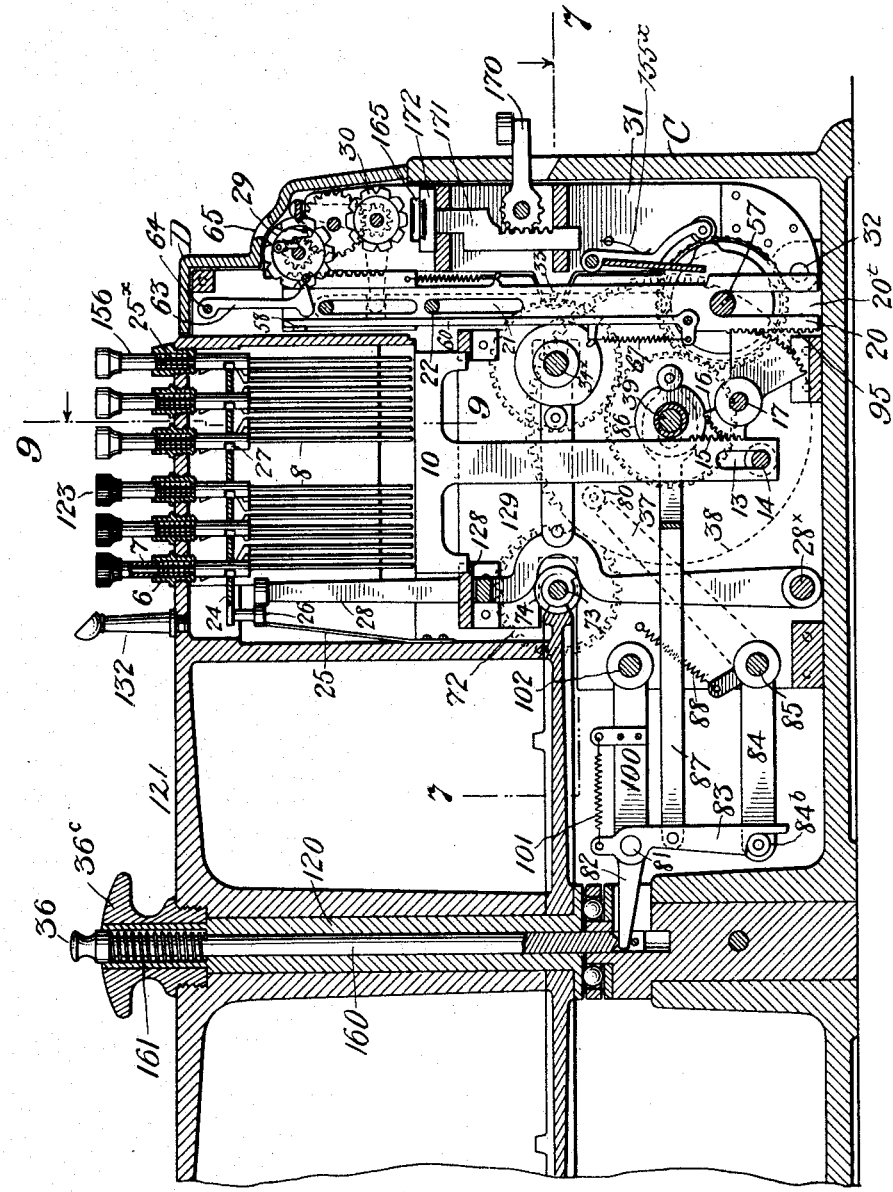
Figure 6:
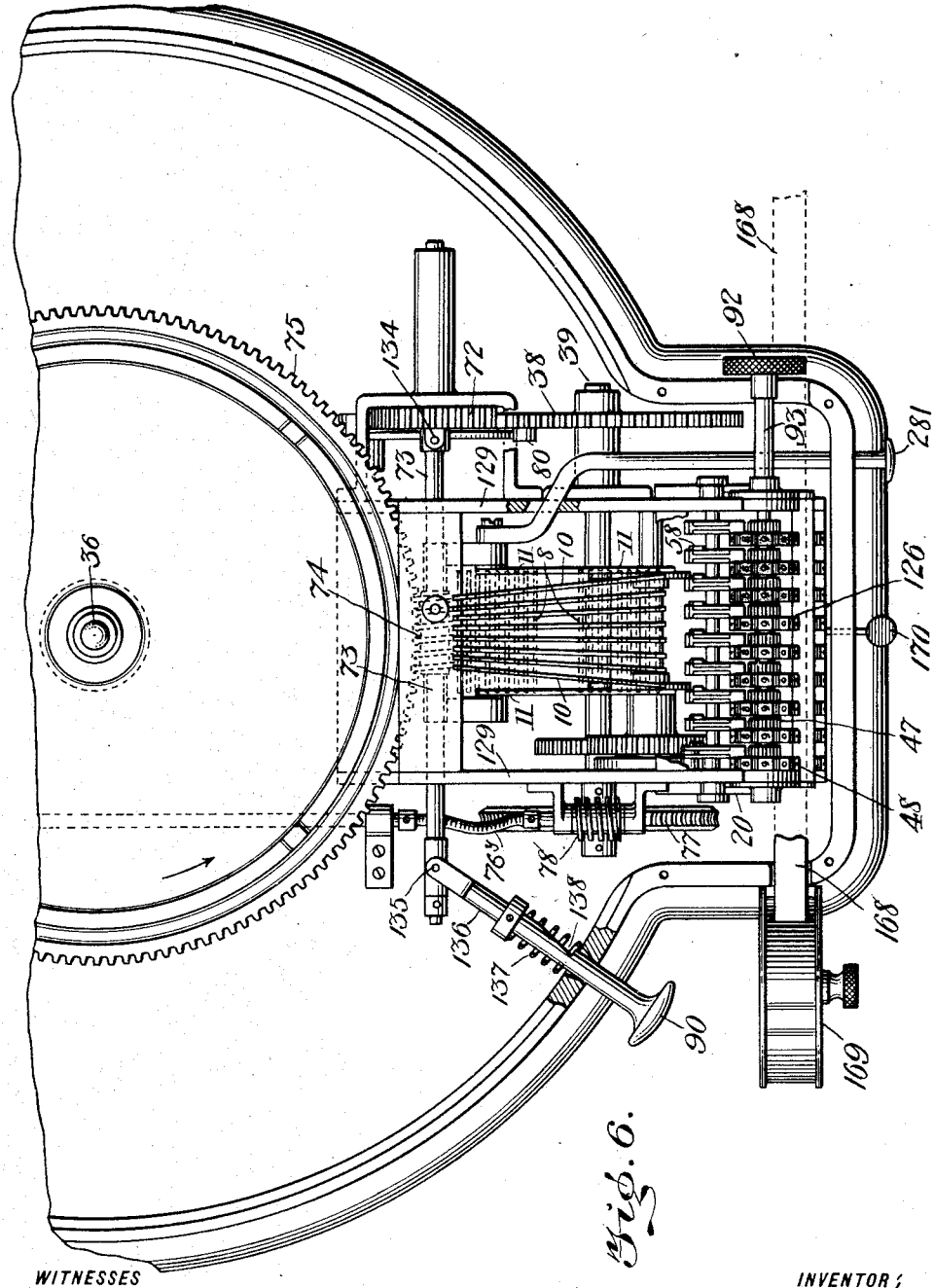
Figure 7:
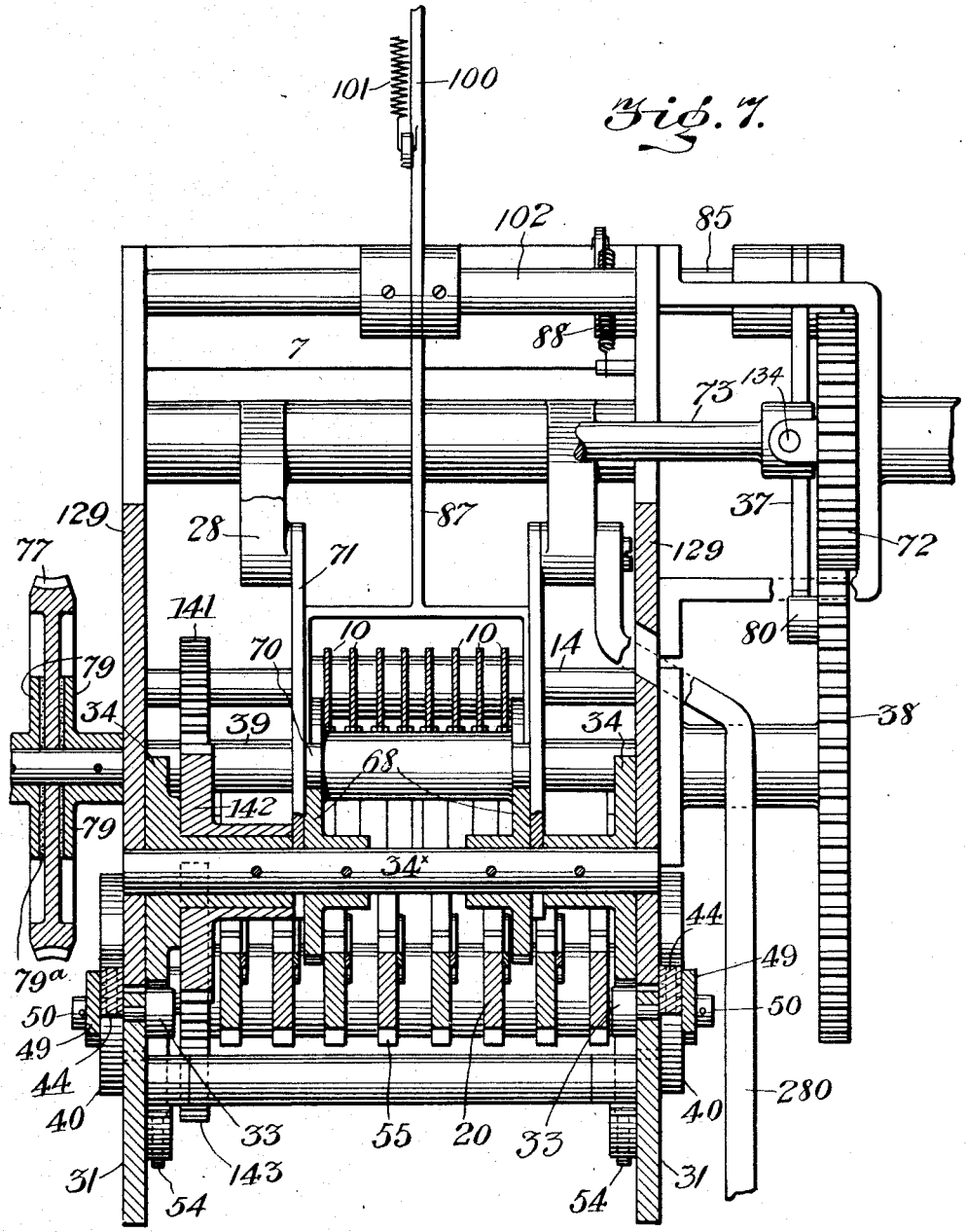
Figure 8:
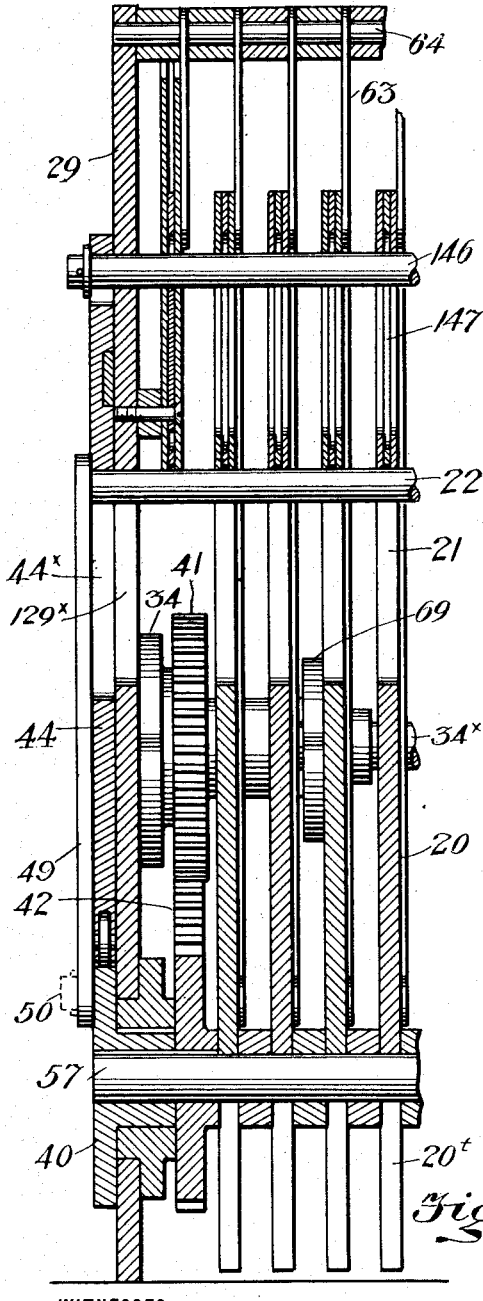
Figure 9:
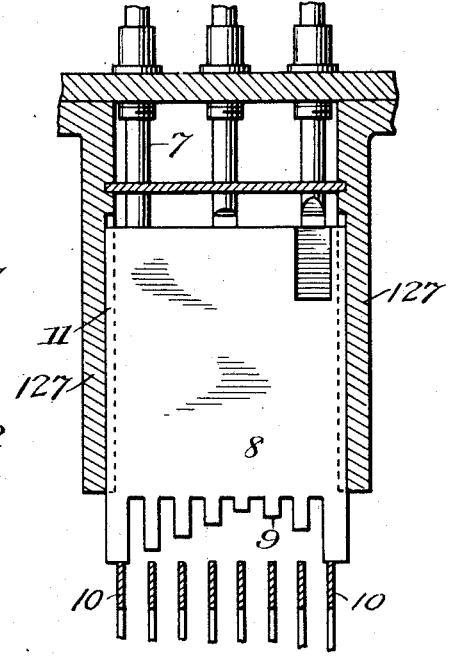
Figure 10:
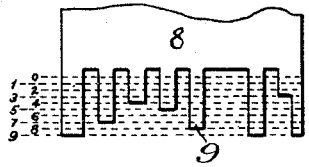
Figure 19:
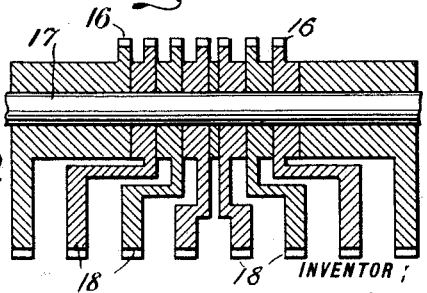

In the accompanying drawings, in which I have illustrated a preferred form of machine construction in accordance with the invention, Figure 1 is a perspective view of the machine, Fig. 2 is a top plan view, Fig. 3 is a front elevation, Fig. 4 is a central vertical section on line 4, 4, Fig. 3, Fig. 5 is a vertical section on a larger scale showing the connection between the digit keys and the counting devices, Fig. 6 is a top plan view of a portion of the mechanism, the upper portion of the casing being removed, Fig. 7 is a horizontal section on an enlarged scale on line 7, 7, Fig. 5, Fig. 8 is a detail vertical section taken through certain of the vertical rack bars and their adjunctive parts, Fig. 9 is a detail section on the line 9—9 of Fig. 5 showing the serrated plate carried by one of the digit keys, and shows the relation of said plate to the upper ends of the depressible key-operated bars, Fig. 10 is a detail view of the lower portion of a serrated plate, upon which the numerical representation of each tooth of the plate is expressed, Fig. 11 is a detail horizontal section taken at a point above the counting disks, Fig. 12 is a detail end elevation of the disks showing the mechanism by which they are automatically locked in position, Fig. 13 is a transverse section on line 13, 13, Fig. 14, Fig. 14 is a partial longitudinal section through the row of counting disks, Fig. 15 is an enlarged section taken on line 15, 15, Fig. 14, showing the manner in which the movable parts of the end rack bar at the left are locked together, Fig. 16 is a detail perspective view showing how the movable parts just mentioned are released from each other, Fig. 17 is a diagrammatic view of the mechanism connecting the digit keys with the counting disks, the parts being shown in the position they assume when all the keys are in normal raised position, Fig. 18 is a similar view showing the effect produced by depressing one of the keys, and Fig. 19 is a horizontal section through the series of gear segments through which the disk-operating bars are actuated.

The machine comprises in its general construction a casing made of substantially cylindrical shape and divided into a lower section, which is fixed, and an upper movable section rotatable on a vertical axis and carrying a plurality of radially arranged groups of digit keys. These keys carry serrated plates, each representing a certain numerical value, as according to my previous patent, and when the upper casing section is rotated to bring a certain group of keys opposite the counting mechanism said plates of that particular group will be adapted to coöperate with a number of vertically slidable bars, against the upper ends of which said plates can contact, and which are arranged in a group in the front part of the casing, which is suitably enlarged at this point to accommodate the counting mechanism.

In the drawing A denotes the lower fixed portion of the cylindrical casing, and B the rotatable key-carrying upper section, this section being rotatable in a horizontal plane on a rotary post 120 extending upward from the fixed base of the casing. The top plate 121 of the upper section B has arranged thereon a plurality of radially disposed groups 122 of digit keys 123, these keys extending into radially arranged compartments formed in an outer annular chamber 124 which is open at the lower part and communicates with the lower casing section, as shown in Fig. 4.

At one point in the circumference of the lower fixed section, which will be termed the front of the machine, the same is provided with a radially extending enlargement C, and placed over the upper open end of this enlargement is a housing D in which the counting disks are inclosed, as shown in Figs. 1 and 4. These counting disks, which are denoted by reference character 126 (Fig. 6), are mounted on a shaft 93 extending longitudinally in the housing D and adapted to be rotated by means of a milled head 92 attached to said shaft at one end. Upon the top surface of the housing D, which lies substantially flush with the top plate 121 of the upper section, is arranged an indicating scale 76 adapted to coöperate with the different groups of keys in a manner which will be hereinafter explained. The enlargement C serves to inclose the connecting or transmitting mechanism interposed between the serrated plates of the operative group and the counting disks. This mechanism comprises depressible members operated by the plates and arranged to move upwardly in the enlargement C and housing D a series of rack bars with which the counting disks can be geared, as will hereinafter appear.

The serrated plates 8 are guided at their side edges 11 in suitable upright grooves in the side walls 127 of their compartments, as shown in Fig. 9, and these plates, which are serrated at their lower edges in the same way as those in my former machine, are adapted to depress vertically slidable bars 10 of substantially T shape against the upper laterally extending heads of which the teeth or serrations 9 of the plates 8 are arranged to abut in order to force the bars 10 downward through a certain distance, this distance in each case corresponding with the length of the tooth 9 which causes such depression. The ends of the lateral portions of the bars are guided vertically in notches 128 formed in brackets or plates connecting the side plates 129 at their upper parts. These side plates are clearly shown in Figs. 5, 6 and 7 where it is seen that they serve to support a number of transverse shafts which form a part of the counting mechanism. Said side plates are connected by a transverse rod 14 extending through slots 13 in the lower ends of the T bars 10 in order to limit the vertical movement of said bars. At their lower ends the vertical slidable T bars are provided with toothed portions 15 which mesh with segments 16 rocking on a transverse shaft 17, as shown in Figs. 17, 18 and 19, the segments 16, like the depressible bars 10, being arranged closely alongside of each other, as shown. Moreover, the segments 16 are formed integral with segments 18 placed oppositely with respect to the shaft 17 and offset laterally from the segments 16, said segments 18 being equidistantly spaced at relatively greater distances. The segments 18 mesh with series of teeth 19 carried by rack bars 20 at the lower ends of the latter, such rack bars being movable vertically and having at their upper portions racks $20^x$ with which pinions 47 carried by the several counting or number disks 126 are adapted to be meshed, as will appear farther on, in order to effect eventually the rotation of the disks on their shaft so as to cause the desired number to appear through the sight openings or slots 65 with which the housing D is provided.

As in my former machine, the digit keys are divided into thirty-six groups, but, as stated, these groups are arranged radially in series of two, the inner group having heads of a color contrasting with that of the key heads in the outer group, as shown in Fig. 1. The outer groups are provided centrally and at the edge of the top plate 121 with indications denoting the number of days for which interest is to be calculated, or with indications of different percentages which the machine may be used to compute, or other indications of a similar nature, as called for by the use of the machine. In Fig. 1, 130 denotes one of the group-indicating blocks associated with the outer edge of the top plate, and it will be noted that below these blocks on such edge are graduations 131 adapted to be brought into register with the graduations on the fixed scale 76. The indications which show the use of the inner groups of digit keys are placed on small upright posts 132 arranged in a circle within the key circle and opposite the respective groups of keys.

In the machine illustrated in the drawing nine counting disks or wheels are employed, but it is obvious that the number may be increased or decreased as desired. In actual practice it has been found that nine wheels or disks are an ample sufficiency for ordinary computations. The teeth 9 of the serrated plates are one less in number than the counting disks, there being only eight, and of course there is a corresponding number of depressible T bars and vertically moving rack bars.

Although the present machine may be operated by an ordinary hand crank, it is peculiarly adapted for operation by an electric motor and accordingly the machine will be described as being operated by such a device. In the embodiment shown the motor $76^x$ is located in the lower casing section A and drives through a flexible shaft $76^y$ a worm 78 meshing with a worm gear 77 mounted on the end of the main shaft 39 journaled in the side frames 129. At the opposite end of said shaft the same carries a large gear wheel 38 meshing with a gear 72 which drives a worm shaft 73 pivoted at 134 to the gear 72 and carrying intermediately of its length a worm 74 engaging a large gear 75 applied to the lower central part of the upper movable casing section so that through the connections described said section will be rotated to the extent of one indication on the scale 76 every time the main shaft 39 makes a complete rotation. The end of the worm shaft 73, which is arranged to swing on the pivotal connection 134, is connected at 135 with a pull rod 90 projecting through the casing at the side of the enlargement C and provided with an operating knob, as best shown in Fig. 1. Said pull rod is provided within the casing with a collar 136 between which and the casing wall a spring 137 is interposed, said spring normally holding the pull rod 90 in its innermost position in which it holds the worm shaft 73 in coöperation with the gear 75 of the upper casing section. However, this engagement may be broken by a pull on the rod 90 against the action of its spring, whereupon the worm 74 will be swung away from the gear 75 and the rod 90 will assume such a position that it can be locked in the outwardly pulled position by a notch 138 which catches on the casing wall, as will be readily understood.

It has already been pointed out that the counting disks 126 are operated by the engagement of the rack bars 20 with pinions 47 fixed to the respective counting disks, but said pinions are not in permanent engagement with said racks; the engagement between these parts is intermittent, as will now be described. The counting disks 126 are supported by means of their shaft 93 in side bars 31 of a rocking frame, the shaft 93 connecting said side bars at their upper ends. The frame in which these side bars are embodied is pivoted at its lower part, as indicated at 32, in the lower part of the casing and adapted to rock on said pivot through a short distance toward and away from the rack bars 20 so that the pinions of the counting disks can be meshed with or released from said rack bars. Pivoted on the shaft 139, which connects the side bars and supports a number of printing wheels 30, as will appear more clearly hereinafter, are elbow levers 140 which constitute locking dogs having a cross-bar 46 adapted to take into the peripheral notches of the counting disks and lock the latter against rotation.

The side bars 31 of the rocking frame carry intermediately of their height projections 150 directed toward and at the side of the rack bars and carrying small rollers 33 engaging cams 34 located on a transverse shaft 34ˣ somewhat above the main shaft 39 and driven therefrom by means of gears 141, 142, as shown in Figs. 5 and 17. The rollers 33 are normally held against the cams 34, which are located at opposite ends of the shaft 34ˣ, as best shown in Fig. 7, by means of small springs 35 (Fig. 4) normally holding the rocking frame 31, 31 toward the side plates 129, with which they are alined, as shown in Fig. 7.

The gear 141 on the main shaft 39 drives, by means of a gear 143, a shaft 57 journaled in the side plates 129 and upon which the rack bars 20 rest by means of elongated notches 20ᵗ cut in said bars at their lower ends, as shown in Figs. 5, 17 and 18. At opposite ends of the shaft 57 are fixed cams 40 adapted to raise vertical bars 44 slidably mounted at 144 on the side plates 129 and having near their upper ends transverse slots 145, as best shown in Fig. 12, in which the laterally extending arms 45 of the elbow-shaped locking dogs 140 are engaged, so that when the bars 44 are raised by their cams the locking dogs will be rocked on their pivot 139 so that their cross-bar 46 will be disengaged from the notches of the counting disks and leave the latter free for rotation.

To the outer faces of the cams 40 vertically arranged connecting bars 49 are pivoted by means of wrist pins 50, as shown in Figs. 4 and 8, and these bars are connected at their upper ends by means of a transverse rod 22 adapted for vertical reciprocation in slots 21 in the rack bars, slots 129ˣ in the side plates 129, and slots 44ˣ in the bars 44. The slidable connection 144 at the upper ends of these last named bars embodies a cross-shaft 146, as shown in Fig. 8, said cross-shaft having slotted engagement with the bars 44, as stated, and also passing through slots 147 in the upper portions of the rack bars, as shown best in Figs. 8 and 13. The cross-rod 22 just mentioned serves to depress the rack bars 20 after the same have been raised by the selecting mechanism described and engaged with the pinions of the counting disks, as will appear more clearly as the description proceeds.

The carrying mechanism employed in connection with the counting disks preferably takes the following form: The rack bars 20 are provided at their upper ends with vertically slidable portions 148, as best shown in Fig. 15, and it is upon these portions that the pinion-engaging teeth 20ˣ are formed. These slidable portions 148 are normally urged in downward direction by means of springs 66, as shown in Figs. 17 and 18, but are arranged to be held in relatively elevated position by means of elbow levers 60 pivoted on the rack bars and controlled by springs 67 to hold catches 58, with which the upper ends of said levers are provided, in engagement with locking recesses 59 with which the movable rack members 148 are provided. Fig. 16 shows one of these notches 59, but the rack member illustrated in this figure is associated with the rack which is farthest to the left, and in this case the catch 58ˣ which coacts with the locking recess is of somewhat different form, being carried at the lower end of a short pivoted arm 149 of which the pivot 151 is arranged above the rack bar, said arm being normally held in engagement with the notch 59 by means of a spring 152 connecting said arm with a suitable fixed point 153 on the frame of the machine. As shown in Fig. 15, there is provided adjacent the pivot 151 a transverse rod 64 from which are suspended a series of releasing dogs 63 having enlarged lower ends 63ˣ. On each counting disk there is arranged a pin 62 so placed on such disk that it engages with the dog 63 belonging to the adjacent disk when the first mentioned disk exhibits the number 9 through the sight opening 65. Should the first mentioned disk be turned an additional space the pin will come in contact with the dog 63, and force it against the lever 60 which holds the upper movable part 148 of the rack bar in place. This effects the release of the catch 58 and permits the slidable rack member to be drawn down by the spring 66 through the distance of one tooth space, causing the counting disk in question to move around an additional space. This provides for the carrying of the numbers from units to tens, from tens to hundreds, and so on, as will be readily understood. The completion of the revolution of the cam 40 causes the cross-rod 22 to be moved upwardly into its normal position, in doing which it pushes the slidable rack member 148 back into place, the catch 58 being again drawn by the action of the spring 67 into the corresponding notch 59.

In order to lock the rack bars in their depressed position after an actuation of the machine the following mechanism is provided: Pivoted to the outer faces of the frame bars 31, as indicated at 53 in Fig. 17, are levers 154 carrying at their free ends rollers 155 adapted to bear, by pressure of the springs 155ˣ against the peripheries of cams 54 fixed on the shaft 57. Said levers 154 carry a transversely extending plate 52 adapted to abut at its lower edge against a suitable shoulder 55 formed on each rack bar. When the high part of the cam strikes the roller 155 each lever is swung on its pivot 53 into such a position as to release the engagement between plate 52 and shoulder 55, as shown in Fig. 17, but when the low part of the cam contacts with said roller the stop plate 52 is held in locking position by the spring 155ˣ. In using ma- In this manner the arrest of the main shaft and of the gear after one revolution is insured.

The zero setting mechanism is substantially the same as according to my patent heretofore mentioned. As previously stated, the counting disks are mounted on a shaft or spindle 93, and this spindle has a longitudinal groove with which engage the spring pressed pawls 94, applied to the side faces of the counting disks 126. These pawls, when the mechanism is to be set to zero are engaged by the grooves in the shaft 93, which is rotated by the milled head 92, so that the counting disks will all be carried back to their initial position in which zero appears through all of the sight openings 65.

It has been heretofore explained that the printing wheels 30 are mounted on a shaft 139 connecting the slide bars 31 of the rocking disk-carrying frame. The printing wheels are of the same diameter as the counting disks or wheels and carry upon their peripheries bosses 161 upon which the printing types 162 are carried, as shown in Fig. 13. The pinions 47 carried by the counting disks are utilized to transmit motion to the printing wheels by means of gears 163, as shown in Figs. 11 and 13, said gears meshing with pinions 164 carried by the printing wheels and having the same number of teeth as the pinions 47 so that the counting disks and printing wheels will be rotated in consonance with each other. The housing D is provided at its ends with slots 165, as shown in Fig. 5, in order to permit an inking ribbon 166 (Fig. 1) to traverse the housing below and immediately adjacent the row of printing wheels. Said ribbon is connected at the ends with spools 167 mounted and operating in any well known manner. Across the casing beneath the inking ribbon the record strip 168 passes, this strip being rolled upon a magazine drum 169 fixed to the side of the enlargement C. When it is desired to make a record of a calculation on this strip all that is necessary is to depress a toothed key 170 which extends out of the casing at the central front portion of the latter and serves to raise a rack bar 171 carrying at its upper end a presser block 172 by means of which the record strip is pressed upward against the inking ribbon and the types of the number wheels 30 which correspond with the numbers visible through the sight openings 65; and there is thereby obtained on the strip a record of the calculation which can be read off when the strip is pulled out of the casing in the direction indicated in dotted lines in Fig. 6. The arrangement of the presser block 172 is clearly illustrated in Fig. 5, but it is to be understood that this mechanism may be varied widely without departing from the invention.

Having described the arrangement and location of the various operative parts of the machine, I will now proceed to set forth the operation of the different devices when a computation is made, and for the sake of clearness an actual problem in the computation of interest will be considered. But first it must be noted that the disks and serrated plates are so related that when the indicator is presented at the first degree of the scale 76, the two teeth farthest on the left of the serrated plates attached to any of the keys in the group of keys presented to the counting mechanism, will, when any of such keys is depressed, contact with the two T bars corresponding to the two disks farthest on the right; if the indicator is presented opposite the second graduation of the scale the three teeth farthest to the left of such serrated plates will contact with the three T bars corresponding to the three disks farthest on the right, and so on. The practical application of this arrangement is that when a key is depressed with the indicator standing at one on the scale, the expression represented by the serrated plates corresponding to the value in the place of units is indicated on the disks; if the indicator points to the second graduation of the scale the expression represented by the serrated plate corresponding to the key value in the place of tens is indicated by the disks, and so on. The reason why in the place of units only two of the T bars are affected, is that the interest on any number in the units place for a period not exceeding 31 days is always represented by an expression in cents less than 10; hence, as this number always begins with zero no disk need be actuated in expressing it.

As heretofore explained there are 36 groups of digit keys, as in my former machine, but in this instance 5 of the groups are used for other purposes. Four of these groups contain keys which are intended to supplement the rates supplied by the groups from 1 to 31, namely rates of interest at $3\frac{1}{2}\%$, $4\frac{1}{2}\%$ and $\frac{3}{4}\%$. Finally group number 36 makes provision for the change of interest due to figuring on a basis of 365 days to the year instead of 360; by expressing the result on the 360 day basis with this particular group of keys the result will be the amount of interest if figured on the 365 day basis.

When the machine is to be operated the group of keys to be used (according to the length of time, the rate of interest, etc.) is presented to the counting mechanism by revolving the upper casing section B, as before described, this being effected by pulling out the pull rod 90 so to free the worm 74 from the gear wheel 75 of the casing section, and permit said section to be revolved freely in either direction until the desired group of keys is brought into cochines of this character it has been found advantageous to provide means for locking in inoperative position the keys of the groups which are not in position to actuate the counting mechanism, and automatically operated means for effecting this purpose form an important part of my present invention. Beneath the top plate 121 there is associated with each group of keys, or rather each pair of groups formed of an inner and an outer group, a horizontally movable locking plate 24, as shown in Figs. 5 and 17, said plate being provided with perforations through which the key shanks 156 extend, the edges of the perforations being adapted to be brought by the lateral movement of the sliding plate 24 into notches 27 in the key shanks, in order to lock the latter against depression. A flat spring 25 bearing against a depending pin 26 at the end of the plate 24 normally holds said plate in its locking position. When, however, a set or group of keys is to be used and is presented to the counting mechanism by the rotation of the key groups the pin 26 comes in contact with the free end of an upwardly directed lever 28 pivoted at 28$^x$, at the base of the machine, as shown in Figs. 5, 17 and 18. This lever is acted upon by mechanism which causes the keys to be locked except at that moment when it is possible through their depression to properly actuate the machine. This mechanism is entirely automatic and preferably takes the form of a connection between the lever 28 and a cam operated when the machine is set in motion. The lever 28 has connected therewith intermediately of its length links 71 having forked ends 158 fitting over the transverse shaft 34$^x$, as shown in Figs. 7 and 17. As shown in the former figure the lever 28 is formed in two parts at its lower portion and its pivot 28$^x$ takes the form of a rock shaft journaled in the side plates 129. Through the connections described said lever is actuated automatically in such a manner as to release the locking plate 24 at the proper time, as will be hereinafter explained. If desired, the lever 28 can be actuated from the exterior of the casing by a rod 280 having an exteriorly protruding knob 281.

Each key shank carries at one side a projection 96 which assumes a position above the locking plate 24 when the key is elevated but which when the key is depressed is caught beneath said plate and held there by the action of the key spring 25$^x$ with which each key is provided. In this manner when a key has been so depressed as to be caught and locked all of the rack bars which have been raised by the selecting mechanism described will be held in the position to which they have been elevated until the key is released and they are permitted to return by gravity.

As has been previously stated, the motor 76$^x$ operates continuously, and mechanism has to be provided by which the same will be coupled with the transmitting devices of the counting mechanism at the proper time. To this end, the gear wheel 77 is not keyed to the main shaft 39 but is freely rotatable thereon; however, disks 79 are attached to the main shaft at both sides of said gear wheel, and said disks are provided with leather or other frictional surfaces 79$^a$ which bear against the gear wheel with sufficient friction to cause the main shaft to revolve under ordinary circumstances. This is prevented, however, by the provision of a stop 80 on the face of the gear 38, which stop coacts with a stop lever 37 pivoted on the stud-shaft 85, as shown in Figs. 5 and 7, said lever being held in a predetermined position by a spring 88, and being connected with a second lever 84 carrying a terminal roller 84$^b$. The last mentioned roller is arranged to take into the recessed end of an elbow lever 83 pivoted at 81 to the end of a horizontal bracket arm 100. Said elbow lever is normally held in engagement with roller 84$^b$ by a contracting spring 101, and the laterally directed arm 82 of the lever is also held by said spring in abutment with a vertically slidable push rod 160 which operates in a bore formed in the post 120, said push rod being provided at its upper end with a button 36 operating in a knob 36$^c$ at the center of the top plate. Within the knob the push rod 160 is acted upon by a spring 161 acting against the under surface of the button and normally holding the latter, and the push rod, in elevated position.

When the button 36 is depressed the arm 82 of the elbow lever 83 is thereby moved downward, causing the lower end of the elbow lever which engages the roller 84$^b$ to depress the lever 84 and thereby move its connected lever 37 out of the path of the stop 80. This releases the gear wheel 38, which immediately revolves under the influence of the gear wheel 77 which grips and carries along the shaft 39. The releasing of the button 36 permits the lever 84 and the arm 82 to return to their normal positions, and causes the return of the stop lever 37 to its initial position in sufficient time to meet the stop 80 at the completion of the revolution made by the gear 38. However, should the button 36 not be promptly released in order to stop the mechanism after one revolution, the cam 86 is provided, said cam being keyed to the main shaft 39 so that as the latter commences to turn the cam pulls on a rod 87 connected with the elbow lever 83 and thus moves said elbow lever out of contact with the lever 84, the latter then being free to move by the action of the spring 88 into such position as to swing the stop lever 37 into the path of the stop. (See Fig. 13.)

operation with the scale 76. The pull rod 90 is then released so that the worm 74 will again mesh with the gear 75 and hold the casing section in the desired position. Of course, at the outset of the operation it has to be seen that the counting disks are all properly set to zero by the zero setting mechanism before described. When the group of keys comes into position in front of the counting disks the locking plate 24 of such group will be moved out of the notches of the key shanks, so that the keys will be left free ready for depression. All is then ready for actuating the keys.

When a key is depressed, as shown in Fig. 18, certain of the teeth of its serrated plate will strike the heads of the vertically slidable T bars, thus producing the downward movement of these bars to an extent corresponding to the length of the plate teeth 9. The key which is depressed is caught by its projection 96 beneath the locking plate 24 whereby the plate and the T bars are held in depressed position. The numbers indicated by the keys and by the teeth of their serrated plates need not be described in detail as the general operation of the machine in this respect is practically the same as in my patented machine.

The depression and locking in position of the T bars causes through the action of the segments 16, 18 and other devices described the raising of the corresponding rack bars to a corresponding extent.

With the locking of the rack bars in their uppermost position all is ready to actuate the counting disks, and this is effected by means of the motor 76$^x$, said motor being coupled with the transmitting mechanism simply by depressing the central button 36 which causes the stop 80 on the gear 38 to be released and permits the rotation of said gear the shaft 39 and the shafts and gears connected therewith. As soon as the gear wheel 38 begins to revolve the cams 40 on the shaft 57 raise the vertical bars 44 which in turn raise the arms 45 of the locking dogs 140, whereby the lock cross-bar 46, which hitherto held the counting disks in fixed position, releases such disks and permits the same to rotate from zero position into such position as to exhibit the required number. At the same time the cams 34 in revolving permit the rocking frame 31 31 to be drawn by the spring 35 into such position that the pinions 47 carried by the counting disks 126 will mesh with the corresponding rack bars 20. The rotation of the main shaft 39 also causes the actuation of the connecting bars or rods 49, through the connections described, thus causing the cross rod 22 which connects said rods to be drawn downward during which movement it abuts against the lower ends of the slots 21 in the raised rack bars. This causes the pulling down of such rack bars through a distance corresponding to that through which they have been raised, and a corresponding actuation of the counting disks will be obtained, as will be readily understood. In this manner the result of the calculation is shown through the sight openings 65. This actuation of the counting disks causes a corresponding actuation of the printing wheels 30, through the mechanism hereinbefore described. As soon as the rack bars are drawn downward, the locking plate 52 is caused by its spring 155$^x$ to swing into engagement with the shoulders 55 on the rack bars, so that the latter will be locked in depressed position. Of course, when numbers or digits are to be carried from one column to another, which occurs in the addition of items on the machine, the carrying mechanism described, comprising the movable rack members 148 and the locking catches 58 will be brought into operation. This mechanism, however, has been previously described and need not be taken up in detail here.

The entire periphery of the gear wheel 38 is not provided with teeth, thus leaving a smooth portion adapted to coact with a corresponding smooth portion on the gear 72. When the wheel 38 is set in motion it slides on the small wheel 72 up to the moment when the keys are released by their locking mechanism. When the teeth of these gear wheels mesh with each other the worm 74 on the shaft is caused to make a complete revolution and this action of the worm causes the rotation of the upper casing through a distance equal to one degree or graduation on the scale 76. In this manner the moving of the key group, so that the interest on the next part of the principal sum can be added to the sum first ascertained, and so on, is obtained, as in the operation of my former machine. The resultant number indicated by the counting disks and recorded by the printing wheels is thus the sum of all the numbers which would have appeared individually on the disks if each operation had been conducted as a separate calculation.

When the shaft 39 has completed a full revolution the various cams will have also completely revolved, and the various mechanisms operated by said cams are returned to initial position, as heretofore indicated, ready for the addition of the next interest item.

In Fig. 10 a plate cut to represent the number 7,458,093 is represented, and, as in my former machine, this number may appear on the disks; but in practice it is not necessary that all of the digits represented by a plate be recorded, and the upper case or casing section is so regulated in its step by step movement that only such numbers as are required are recorded.

The operation of the machine in connection with a specific example will now be taken up. Assume, for instance, that we require the interest on $95,684.00 for 17 days at 6%. In this example interest will be calculated on a basis of 360 days to the year, which is the usual basis in this country. We would place the group of keys marked 17 (indicating the number of days) in coöperation with the counting devices, with the indicator pointing to the number 1 on the scale 76. This space marked 17 has nine keys, each of which operates a particular plate the serrations or teeth of which indicate predetermined numbers. In this instance these plates would be toothed to indicate numbers according to the following table:

Plate number 1 would be serrated to indicate .02833333
"     "     2   "    "    "      "    "     .05666666
"     "     3   "    "    "      "    "     .08500000
"     "     4   "    "    "      "    "     .11333333
"     "     5   "    "    "      "    "     .14166666
"     "     6   "    "    "      "    "     .17000000
"     "     7   "    "    "      "    "     .19833333
"     "     8   "    "    "      "    "     .22666666
"     "     9   "    "    "      "    "     .25500000

These numbers indicate the interest for 17 days at 6% on the digit to which each respectively refers. Thus in the case of the digit 4, which forms the first item in our problem, the interest is .011,333333, the zero at the beginning of the expression being omitted from the plate for the reasons given above. Of course it is evident that in order to ascertain the interest on ten times 4, or 40, it is only necessary to move the decimal point in the above expression one point to the right, thus multiplying the expression by ten and obtaining as a product 0.11333333; similarly the interest on 400 is 1,133333, and so on, which makes clear the reason why the groups of keys undergo their step by step movement to the left.

As explained above, we require only the first three digits when the calculation is in the place of units. Hence the number which would appear on the counting disks after the key marked 4 has been depressed and the mechanism actuated is .011, all decimals. As the zero space on the corresponding serrated plate does not contact with a T bar only two of such bars will be depressed, that is to say, the two bars on the extreme right, and these bars through the connections described will raise the corresponding rack bars which move their disks into the position in which they both show the digit 1 through their sight openings, this operation being effected through the depression of the button 36, as previously described. This actuation of the machine also includes the feeding or shifting movement of the lever group to the left to the extent of one graduation on the scale 76, and after this has been caused all is ready for the next step in the calculation, which is to depress the key in the same group marked 8. Referring to the table of predetermined numbers, we find that corresponding to the figure 8 is .22666666; but the number on which we require the interest is $80.00 instead of $8.00, and this is why the plate-carrying case must move one degree to the left after each operation. If now we depress the key marked 8, we will find that three figures of the above number are presented and in readiness to be recorded on the disk, namely, .226, still all decimals. On actuating the mechanism the disks will show .011 plus .226, or .237, while the upper casing section will again have moved one degree to the left, ready for the operation on the next digit, 6. This arises from the fact that the plate-carrying upper case section having moved two degrees to the left, the principal involved now becomes 600, and the interest, 1.700, is added to the previous result, the disks now showing 1.937. Similarly the interest on $5,000.00, namely $14.166, and on $90,000.00, namely $255.000, are added, and the final result, as shown on the disks, will be $271.104, according to the following table:

Interest on___ $4         .011   333333
    "    "___  80         .226   66666
    "    "___ 600        1.700   0000
    "    "___ 5,000      14.166  666
    "    "___ 90,000    255.000  00
              _____   _____
              $95,684    $271.104 665993 the numbers on the right of the third place of decimals being the superfluous numbers, which are not recorded.

The machine may readily be so arranged as to reduce interest from 6% to any other rate desired and predetermined. Moreover, it is a fact that any amount of interest which has been figured at 6% on a basis of 360 days to the year, as is principally contemplated by my machine, can be reduced or converted to the rate of interest which is indicated by the denomination of any of the groups of keys on this machine, by merely writing the amount at 6% on that particular group of keys, as in figuring interest, except that the operation must be begun at the second degree or graduation of the scale instead of at the first. Thus should it be desired to reduce an amount of interest from 6% to 5%, it would only be necessary to write the amount at 6% on the keys pertaining to the five-day group, starting at the second degree of the scale, when the amount reduced to 5% would appear on the disks; similarly with any other group of keys. It will also be seen that since by writing on the fifteen-day group and starting at the second degree of the scale the amount is changed to 15%, therefore if we start such a reduction at the first degree of the scale the amount will be reduced to 1.5%, or 1½%; similarly on the twenty-five day group interest may be converted to either 25% or 2.5%, that is 2½%; or, by starting at an undesignated degree one space to the right of the scale, the reduction is made to .25%, or ¼%. The purpose of groups numbers 32 to 35 now becomes clear, they being used to compute interest at 3½%, 4½%, 5½%, and ¾%, as heretofore explained; and a group number marked $\frac{360}{365}$ makes provision for a change from the 360-day basis to the 365-day basis, as has also been explained.

On the groups marked 3½, 4½, 5½ and ¾ respectively, interest can be computed for 35, 45, 55 and 75 days respectively. It is also manifest that by commencing any of the ordinary operations on the second degree of the scale instead of on the first, the result will be the interest for ten times the number of days indicated as appertaining to any group of keys; for instance, if in the example above described in detail, we had commenced at the second degree of the scale instead of the first, it is apparent that the result obtained would have been the interest for 170 days instead of 17. Therefore, it also becomes clear that if we desire to figure interest for a period longer than 31 days, we can readily do so for a practically unlimited number of days by two operations; suppose, for instance, we figure first for 7 days, and then, without erasing this result from the disks, we should figure the interest for 17 days, commencing at the second degree of the scale; the machine would automatically add these two amounts together, and the final result would be the interest for 177 days. Or, if desired for the purpose of checking, the groups used might be 17 days, and 160 days. Hence the machine is practically unlimited in its scope.

Owing to the arrangement of the digit keys on the rotary casing section and the fact that said section may be detached and lifted off from the lower fixed section if desired, it is possible to remove all of the groups of keys in order that another upper casing section with differently arranged keys and serrated plates can be substituted. The new serrated plates will of course be adapted for the kind of calculation which it is desired to make. Thus one set of keys and plates might calculate and reduce interest and, these having been removed, another set might be placed in position for the purpose of calculating exchange.

The compact arrangement of the casing and the mechanism therein, the ease with which any desired key group may be brought into coöperative relation with the counting devices, the direct connection between these keys, when in such position, and the counting disks, the facility with which the counting mechanism is operated (merely by depressing a button) and the ready detachability of the upper casing section for the purpose just pointed out above, are important advantages attained by the invention. The arrangement of the locking mechanism for the keys and the provision of the recording mechanism are also important features. These being the general outlines of a machine constructed according to the invention, I do not limit myself to the detailed construction shown and described, but desire to reserve the right to use any such modifications as fall fairly within the scope of the invention.

Having thus described my invention, I claim:

1. In a calculating machine, the combination, with fixed counting devices, of groups of digit keys arranged in a circle and mounted for rotation to bring any group into coöperative relation with said counting devices.

2. In a calculating machine, the combination, with a rotary series of circularly arranged key groups, of counting mechanism located adjacent the outer edge of the circle of key groups and into coöperative relation with which any of said groups may be moved.

3. In a calculating machine, the combination of a plurality of keys arranged in a circle and divided into radially disposed groups, and fixed counting mechanism into coöperation with which any of said groups may be swung.

4. In a calculating machine, the combination of a plurality of keys arranged in a circle and divided into radially disposed groups, and fixed counting mechanism into coöperation with which any of said groups may be swung, said counting mechanism being located adjacent the outer edge of the circle of keys.

5. In a calculating machine, the combination of a circle of operating devices divided into groups and rotatable about a central vertical axis, and counting mechanism located at the circumference of the circle of devices and into coöperation with which the various groups can be swung by a lateral movement on such axis.

6. The combination, with fixed counting mechanism, of a rotary circular casing carrying a plurality of keys divided into groups and each arranged for presentation to said counting mechanism.

7. The combination, with fixed counting mechanism, of a casing rotatable about a vertical axis and carrying radially arranged groups of operating devices each of which groups is designed to be presented to and to operate said counting mechanism.

8. The combination, with a rotary casing mounted to swing on an upright axis and carrying radially arranged groups of operating devices, and fixed counting mechanism located at the circumference of the circle formed by such devices and which can be operated by any group of such devices when said group is presented opposite and in register with said counting mechanism.

9. The combination of a casing section mounted to rotate on a vertical axis and comprising a top plate, operating devices projecting upwardly through said top plate from the interior of the casing and arranged in a circular series on the top plate, and counting mechanism operated by said devices.

10. The combination of a circle of laterally movable digit keys, said keys being divided radially into groups and each group consisting of an inner and outer series representing different values, and counting mechanism actuated by said keys.

11. The combination of a cylindrical casing comprising a fixed lower section, a rotary upper section, counting mechanism fixed with relation to the lower section and located therein, and digit keys carried by the upper section.

12. The combination of a lower casing section having counting mechanism located therein eccentrically of said section, an upper revoluble casing section, and keys carried by said last named section and arranged to be swung with the upper casing section over parts of the counting mechanism which are operated by said keys.

13. In a calculating machine such as described, a lower casing which contains the counting mechanism, a revoluble upper section carrying selecting mechanism, a continuously rotating motor in the casing, and a coupling between the motor and the counting mechanism and the revoluble upper section by which the latter is given a short feeding movement on its axis at each actuation of the selecting mechanism.

14. The combination, with a cylindrical lower casing having a radial enlargement, of counting mechanism housed in such enlargement and comprising a series of counting disks, a housing located above said enlargement and having sight openings through which said disks are visible, and an upper rotary casing section carrying circularly arranged groups of keys arranged to be brought into coöperation with the counting mechanism, said housing being located at the peripheral portion of the upper casing section.

15. The combination, with the rotary circularly arranged series of digit keys divided into groups, indicating devices carried by each group, and a fixed scale with which said indicating devices are caused to register.

16. The combination, with counting mechanism and a fixed casing or housing therefor having a scale on its upper surface, of a revoluble casing section lying flush with and adjacent said scale, and operating devices carried by said casing section and divided into groups arranged to be brought into coöperation with said scale.

17. In an interest-calculating machine, the combination, with counting mechanism, of keys movable into coöperation therewith and divided into groups representing a number of days, and a number of rates of percentage.

18. In an interest-calculating machine, the combination, with counting mechanism, of keys movable into coöperation therewith and divided into groups representing a number of days, a number of rates of percentage, and an additional group by which the interest calculated on a certain sum according to one basis may be used to determine the amount according to another basis.

19. In an interest-calculating machine, the combination, with counting mechanism, of a plurality of groups of digit keys movable into coöperation therewith, and divided into groups arranged according to the period of time with relation to a fixed percentage, groups to determine the interest at fractional percentages, and means to transpose the result of a calculation according to one time basis to another time basis.

20. In a calculating machine having a rotary section and a stationary section, counting mechanism arranged in one section, groups of operating devices arranged in the other section and adapted to be brought into coöperation with the counting mechanism to actuate it according to a certain ratio, and means in connection with the counting mechanism to form a printed record of the calculation.

21. In a calculating machine having a rotary section and a stationary section, counting mechanism arranged in the stationary section and comprising a series of counting disks, groups of operating devices arranged in the rotary section and adapted to be brought into coöperation with the counting disks to actuate them according to a certain ratio, and recording mechanism including printing wheels geared to the counting disks to form a record of the calculation.

22. In a calculating machine, the combination of a rotary casing section, a gear carried thereby within the casing, a pivoted driving shaft carrying a worm meshing with said gear, and means operable from the exterior of the casing to swing said shaft on its pivot so that the worm and gear are disengaged.

23. In a calculating machine, the combination of a rotary casing section, a continuously operating motor, a system of gears intermittently actuated by said motor and causing the shifting movement of said casing section on its axis, and means by which said geared connection can be disengaged to produce the free rotation of the casing section in either direction.

24. In a calculating machine, the combination of a rotary casing section, a fixed casing section, means in the latter to cause a shifting or feeding movement of the rotary section, and means operable from the exterior of the casing whereby said first named means may be uncoupled from the rotary section.

25. The combination, with counting mechanism, of a group of operating keys movable bodily into a position in line with said counting mechanism, and means by which the keys are automatically locked against movement except when in this last named position.

26. The combination, with counting mechanism occupying a fixed position, of a rotary series of operating keys for said mechanism arranged in groups adapted to be swung successively into register with the counting mechanism.

27. The combination, with counting mechanism occupying a fixed position, of a rotary series of operating keys for said mechanism arranged in groups adapted to be swung successively into register with the counting mechanism, and means for automatically locking said keys in elevated inoperative position except when in such register with the counting mechanism.

28. In a calculating machine, the combination of counting mechanism embodying a single series of depressible operating bars, and digit keys arranged in groups which coact with said bars.

29. In a calculating machine, the combination of counting mechanism embodying depressible operating bars, and a plurality of movable key groups divided into pairs which are simultaneously moved into position to coact with said bars.

30. In a calculating machine, the combination of counting mechanism including a series of operating bars, and a plurality of circularly movable key groups arranged in pairs which are synchronously moved into operative position with respect to said bars.

31. The combination of counting mechanism embodying a series of depressible operating bars, and a plurality of circularly movable key groups with respect to which the bars are relatively fixed and which are located above the bars in such a manner that when alined with the latter the keys can operate said bars.

32. The combination of counting mechanism embodying a series of depressible operating bars, and a plurality of key groups movable in a circular path over said bars.

33. The combination of counting mechanism embodying a series of depressible operating bars, and a plurality of circularly arranged and circularly movable key groups each of which can be swung laterally over said bar series into position to actuate the same.

34. The combination with the depressible operating bars of the counting mechanism, of a plurality of circularly arranged and circularly movable key groups divided into inner and outer series forming pairs each of the series of which is movable into position above the bars.

35. The combination with counting mechanism of vertical slidable T-bars for operating the counting mechanism and groups of keys carrying devices to abut against and depress the laterally extending heads of said bars.

36. The combination of two adjacent groups of digit keys, serrated plates carried thereby, a single series of T-bars depressed by the plates of both groups, and counting devices operated by the T-bars.

37. In a calculating machine, a plurality of keys, depressible toothed operating bars actuated by the keys, a plurality of vertically disposed sliding racks, double-faced rocking toothed segments interposed between the operating bars and the racks to convert the downward movements of the operating bars into upward movements of the racks, and an adding mechanism having pinions adapted to mesh with the racks.

38. In a calculating machine, a plurality of depressible keys, a plurality of vertically disposed sliding racks, mechanism including double-faced rocking toothed segments to convert the downward movements of the racks into upward movements of the racks, an adding mechanism having pinions adapted to mesh with the racks, and means for depressing the racks.

39. In a calculating machine, a plurality of vertically disposed sliding racks having shoulders on their outer sides, depressible keys which upon being depressed raise the racks, counting disks carrying pinions to mesh with the racks, means for lowering the racks, and a pivoted plate coacting with the shoulders to hold the racks in depressed position.

40. In a calculating machine, a plurality of vertically disposed sliding racks, having shoulders on their outer sides, depressible keys directly operable on the racks to raise them, counting disks carrying pinions to mesh with the racks, means for lowering the racks, a pivoted plate coacting with the shoulders to hold the racks in depressed position, and cam mechanism coöperative with the pivoted plate to swing it to a position in which the racks are free to move vertically.

41. In a calculating machine, a plurality of depressible keys and operating mechanism actuated thereby forming one member, counting mechanism forming a second member, one of said members being rotatable and the other of said members being stationary, means for moving the rotatable member to bring its mechanism into predetermined coöperative relation with the locking mechanism designed to lock those keys which are not effective on that part of the operating mechanism which is in coöperative relation with the counting mechanism.

42. In a calculating machine the combination of a rotary casing section, a post with which the same rotates, a motor in the casing to operate said casing section and a pusher rod operating in said post and by which the motor can be coupled to or released from said casing section.

In testimony whereof I affix my signature, in presence of two witnesses.

HUBERT A. HENSLEY.

Witnesses:
WALTER W. HESS,
MORTIMER I. COHN.

Copies of this patent may be obtained for five cents each, by addressing the "Commissioner of Patents, Washington, D. C."